United States Patent
Koga et al.

(10) Patent No.: US 12,151,585 B2
(45) Date of Patent: Nov. 26, 2024

(54) SYSTEM AND METHOD FOR THERMAL MONITOR CONTROLS

(71) Applicant: Oshkosh Corporation, Oshkosh, WI (US)

(72) Inventors: Jeffrey Koga, Oshkosh, WI (US); Emily Davis, Rochester, MN (US); Clinton T. Weckwerth, Pine Island, MN (US); Vincent Hoover, Bryon, MN (US); Zachary L. Klein, Rochester, MN (US); Jerrod Kappers, Oshkosh, WI (US); Derek A. Wente, Austin, MN (US); Logan Gary, Oshkosh, WI (US); Joshua D. Rocholl, Rochester, MN (US); Chad K. Smith, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 553 days.

(21) Appl. No.: 17/484,263

(22) Filed: Sep. 24, 2021

(65) Prior Publication Data

US 2022/0097556 A1    Mar. 31, 2022

Related U.S. Application Data

(60) Provisional application No. 63/084,420, filed on Sep. 28, 2020.

(51) Int. Cl.
*B60L 58/10* (2019.01)
*B60L 3/00* (2019.01)
*B65F 3/14* (2006.01)

(52) U.S. Cl.
CPC ............ *B60L 58/10* (2019.02); *B60L 3/0046* (2013.01); *B65F 3/14* (2013.01); *B60L 2240/545* (2013.01); *B60Y 2200/144* (2013.01); *B65F 2003/146* (2013.01)

(58) Field of Classification Search
USPC .......................................................... 702/63
See application file for complete search history.

(56) References Cited

U.S. PATENT DOCUMENTS

| | | |
|---|---|---|
| 2,946,802 A | 7/1960 | Zima et al. |
| 5,171,121 A | 12/1992 | Smith et al. |
| 5,378,010 A | 1/1995 | Marino et al. |
| 6,266,598 B1 | 7/2001 | Pillar et al. |
| 6,421,593 B1 | 7/2002 | Kempen et al. |
| 6,553,290 B1 | 4/2003 | Pillar |

(Continued)

*Primary Examiner* — Paul D Lee
(74) *Attorney, Agent, or Firm* — Foley & Lardner LLP (57) ABSTRACT

A thermal monitor control system for a refuse vehicle includes a plurality of onboard devices including a first onboard device and a second onboard device, a plurality of sensors including a first sensor configured to collect a first data set and a second sensor configured to collect a second data, and a processing circuit configured to receive the first data set from the first sensor and the second data set from the second sensor, define a normal operating profile, receive a third data set from the first senor and a fourth data set from the second sensor, compare the third data set and the fourth data set to the normal operating profile, and cause the onboard messaging system to display the alert to the operator in response to determining that the third data set or the fourth data set differs from the normal operating profile.

20 Claims, 10 Drawing Sheets

(56) References Cited

U.S. PATENT DOCUMENTS

| | | |
|---|---|---|
| 6,757,597 B2 | 6/2004 | Yakes et al. |
| 6,885,920 B2 | 4/2005 | Yakes et al. |
| 6,909,944 B2 | 6/2005 | Pillar et al. |
| 6,922,615 B2 | 7/2005 | Pillar et al. |
| 6,993,421 B2 | 1/2006 | Pillar et al. |
| 7,006,902 B2 | 2/2006 | Archer et al. |
| 7,024,296 B2 | 4/2006 | Squires et al. |
| 7,072,745 B2 | 7/2006 | Pillar et al. |
| 7,107,129 B2 | 9/2006 | Rowe et al. |
| 7,127,331 B2 | 10/2006 | Pillar et al. |
| 7,162,332 B2 | 1/2007 | Pillar et al. |
| 7,164,977 B2 | 1/2007 | Yakes et al. |
| 7,184,862 B2 | 2/2007 | Pillar et al. |
| 7,184,866 B2 | 2/2007 | Squires et al. |
| 7,254,468 B2 | 8/2007 | Pillar et al. |
| 7,274,976 B2 | 9/2007 | Rowe et al. |
| 7,277,782 B2 | 10/2007 | Yakes et al. |
| 7,302,320 B2 | 11/2007 | Nasr et al. |
| 7,392,122 B2 | 6/2008 | Pillar et al. |
| 7,522,979 B2 | 4/2009 | Pillar |
| 7,555,369 B2 | 6/2009 | Pillar et al. |
| 7,689,332 B2 | 3/2010 | Yakes et al. |
| 7,711,460 B2 | 5/2010 | Yakes et al. |
| 7,715,962 B2 | 5/2010 | Rowe et al. |
| 7,756,621 B2 | 7/2010 | Pillar et al. |
| 7,831,363 B2 | 11/2010 | Quigley |
| 8,095,247 B2 | 1/2012 | Pillar et al. |
| 9,062,983 B2 | 6/2015 | Zych |
| 9,981,803 B2 | 5/2018 | Davis et al. |
| 10,414,385 B2 | 9/2019 | Linsmeier et al. |
| D869,332 S | 12/2019 | Gander et al. |
| D899,452 S | 10/2020 | Klimes et al. |
| 10,800,605 B2 | 10/2020 | Rocholl et al. |
| 10,843,379 B2 | 11/2020 | Rocholl et al. |
| 10,858,231 B2 | 12/2020 | Holmes et al. |
| 10,859,167 B2 | 12/2020 | Jax et al. |
| 10,901,409 B2 | 1/2021 | Datema et al. |
| D910,670 S | 2/2021 | Klimes et al. |
| 10,997,802 B2 | 5/2021 | Koga et al. |
| 11,001,135 B2 | 5/2021 | Yakes et al. |
| 11,001,440 B2 | 5/2021 | Rocholl et al. |
| 11,007,863 B2 | 5/2021 | Yakes et al. |
| 11,021,078 B2 | 6/2021 | Rocholl et al. |
| 11,046,329 B2 | 6/2021 | Clifton et al. |
| 11,059,436 B2 | 7/2021 | Wildgrube et al. |
| 11,097,617 B2 | 8/2021 | Rocholl et al. |
| 11,110,977 B2 | 9/2021 | Smith et al. |
| 11,136,187 B1 | 10/2021 | Koga et al. |
| 11,137,002 B2 | 10/2021 | Clifton et al. |
| 11,148,550 B2 | 10/2021 | Rocholl et al. |
| 11,148,880 B1 | 10/2021 | Koga et al. |
| 11,161,415 B1 | 11/2021 | Koga et al. |
| 11,167,734 B2 | 11/2021 | Linsmeier et al. |
| 11,167,919 B1 | 11/2021 | Koga et al. |
| 11,254,498 B1 | 2/2022 | Koga et al. |
| 11,254,499 B2 | 2/2022 | Rocholl et al. |
| 11,254,500 B2 | 2/2022 | Buege et al. |
| 11,488,467 B1 * | 11/2022 | Nguyen ............... G06V 10/803 |
| 2002/0071336 A1 | 6/2002 | Smith et al. |
| 2003/0038637 A1 * | 2/2003 | Bertness ............. H02J 7/00047 |
| | | 324/426 |
| 2008/0215190 A1 | 9/2008 | Pillar et al. |
| 2010/0301668 A1 | 12/2010 | Yakes et al. |
| 2010/0313849 A1 * | 12/2010 | Stoner ................... B60W 10/02 |
| | | 417/1 |
| 2016/0378076 A1 * | 12/2016 | Hill ...................... G05B 13/026 |
| | | 700/28 |
| 2018/0265289 A1 | 9/2018 | Davis et al. |
| 2019/0039407 A1 | 2/2019 | Smith |
| 2019/0322321 A1 | 10/2019 | Schwartz et al. |
| 2020/0262366 A1 | 8/2020 | Wildgrube et al. |
| 2020/0265656 A1 | 8/2020 | Koga et al. |
| 2020/0316816 A1 | 10/2020 | Messina et al. |
| 2020/0317083 A1 | 10/2020 | Messina et al. |
| 2020/0346547 A1 | 11/2020 | Rocholl et al. |
| 2020/0346556 A1 | 11/2020 | Rocholl et al. |
| 2020/0346557 A1 | 11/2020 | Rocholl et al. |
| 2020/0346657 A1 | 11/2020 | Clifton et al. |
| 2020/0346854 A1 | 11/2020 | Rocholl et al. |
| 2020/0346855 A1 | 11/2020 | Rocholl et al. |
| 2020/0346856 A1 | 11/2020 | Rocholl et al. |
| 2020/0346858 A1 | 11/2020 | Buege et al. |
| 2020/0346859 A1 | 11/2020 | Buege et al. |
| 2020/0346861 A1 | 11/2020 | Rocholl et al. |
| 2020/0346862 A1 | 11/2020 | Rocholl et al. |
| 2020/0347659 A1 | 11/2020 | Rocholl et al. |
| 2020/0347661 A1 | 11/2020 | Rocholl et al. |
| 2020/0348681 A1 | 11/2020 | Clifton et al. |
| 2020/0348764 A1 | 11/2020 | Clifton et al. |
| 2020/0399058 A1 | 12/2020 | Rocholl et al. |
| 2021/0031649 A1 | 2/2021 | Messina et al. |
| 2021/0054942 A1 | 2/2021 | Jax et al. |
| 2021/0069934 A1 | 3/2021 | Rocholl et al. |
| 2021/0070595 A1 | 3/2021 | Holmes et al. |
| 2021/0139303 A1 | 5/2021 | Rosencrance et al. |
| 2021/0221216 A1 | 7/2021 | Yakes et al. |
| 2021/0225095 A1 | 7/2021 | Koga et al. |
| 2021/0229755 A1 | 7/2021 | Schwartz et al. |
| 2021/0229908 A1 | 7/2021 | Rocholl et al. |
| 2021/0252995 A1 | 8/2021 | Rocholl et al. |
| 2021/0316740 A1 | 10/2021 | Clifton et al. |
| 2021/0316741 A1 | 10/2021 | Clifton et al. |
| 2021/0323436 A1 | 10/2021 | Rocholl et al. |
| 2021/0323437 A1 | 10/2021 | Rocholl et al. |
| 2021/0323438 A1 | 10/2021 | Rocholl et al. |
| 2021/0323763 A1 | 10/2021 | Koga et al. |
| 2021/0323764 A1 | 10/2021 | Koga et al. |
| 2021/0324880 A1 | 10/2021 | Wente et al. |
| 2021/0325529 A1 | 10/2021 | Koga et al. |
| 2021/0325911 A1 | 10/2021 | Koga et al. |
| 2021/0326550 A1 | 10/2021 | Kappers et al. |
| 2021/0327164 A1 | 10/2021 | Koga et al. |
| 2021/0327170 A1 | 10/2021 | Rocholl et al. |
| 2021/0327237 A1 | 10/2021 | Rocholl et al. |
| 2021/0331635 A1 | 10/2021 | Wildgrube et al. |
| 2021/0331636 A1 | 10/2021 | Wildgrube et al. |
| 2021/0331637 A1 | 10/2021 | Wildgrube et al. |
| 2021/0339632 A1 | 11/2021 | Rocholl et al. |
| 2021/0339648 A1 | 11/2021 | Koga et al. |
| 2021/0339949 A1 | 11/2021 | Rocholl et al. |
| 2021/0345062 A1 | 11/2021 | Koga et al. |
| 2021/0373560 A1 | 12/2021 | Koga et al. |
| 2021/0380179 A1 | 12/2021 | Smith et al. |
| 2021/0396251 A1 | 12/2021 | Clifton et al. |
| 2021/0407222 A1 | 12/2021 | Koga et al. |
| 2022/0009338 A1 | 1/2022 | Yakes et al. |
| 2022/0033181 A1 | 2/2022 | Koga et al. |

* cited by examiner

SYSTEM AND METHOD FOR THERMAL MONITOR CONTROLS

CROSS-REFERENCE TO RELATED APPLICATION

This application claims priority to U.S. Provisional Patent Application No. 63/084,420, filed Sep. 28, 2020, the content of which is hereby incorporated by reference in its entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One exemplary embodiment relates to a thermal monitor control system for a refuse vehicle. The thermal monitor control system includes a plurality of onboard devices including a first onboard device and a second onboard device, a plurality of sensors including a first sensor configured to collect a first data set corresponding with a normal operating condition of the first onboard device and a second sensor configured to collect a second data set corresponding to a normal operating condition of the second onboard device, an onboard message system configured to display an alert to an operator, and a processing circuit including one or more processors coupled to non-transitory memory, wherein the processing circuit is configured to receive the first data set from the first sensor and the second data set from the second sensor, define a normal operating profile for the first onboard device based on the first data set and the second onboard device based on the second data set, receive a third data set from the first senor and a fourth data set from the second sensor, wherein the third data set and the fourth data set are collected after the normal operating profile is defined, compare the third data set and the fourth data set to the normal operating profile to determine if the third data set or the fourth data set differ from the normal operating profile, and cause the onboard messaging system to display the alert to the operator in response to determining that the third data set or the fourth data set differs from the normal operating profile.

Another exemplary embodiment relates to a method of monitoring onboard devices of a refuse vehicle. The method includes providing the refuse vehicle comprising a plurality of onboard devices including a first onboard device and a second onboard device, providing a plurality of sensors including a first sensor configured to collect a first data set corresponding with a normal operating condition of the first onboard device and a second sensor configured to collect a second data set corresponding to a normal operating condition of the second onboard device, providing an onboard message system configured to display an alert to an operator, measuring the first data set with the first sensor and the second data set with the second sensor, defining a normal operating profile for the first onboard device based on the first data set and the second onboard device based on the second data set, measuring a third data set with the first sensor and a fourth data set with the second sensor, wherein the third data set and the fourth data set are collected after the normal operating profile is defined, and proving the alert to the onboard messaging system for display in response to the third data set or the fourth data set differing from the normal operating profile.

Another exemplary embodiment relates to a remote computing system for monitoring components of a refuse vehicle. The remote computing system includes a network interface circuit configured to facilitate data transmission over a network, and configured to receive a first data set from a first sensor corresponding with a normal operating condition of a first onboard device located on a first refuse vehicle and a second data set from a second sensor corresponding to a normal operating condition of a second onboard device located on the first refuse vehicle from the first refuse vehicle, receive a third data set from the first sensor and a fourth data set from the second sensor from the first refuse vehicle, wherein the third data set and the fourth data set are collected after a normal operating profile is defined, and provide an alert to the first refuse vehicle. The remote computing system also includes a processing circuit comprising one or more processors coupled to non-transitory memory, the processing circuit configured to define the normal operating profile for the first onboard device based on the first data set and the second onboard device based on the second data set, and generate the alert in response to the third data set or the fourth data set differing from the normal operating profile.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to systems, apparatuses, and methods for thermal monitor controls. Refuse vehicles, including electric refuse vehicles (i.e., E-refuse vehicles), include an onboard energy storage device, like a battery, that provides power to a motor that produces rotational power to drive the vehicle. The energy storage device, which is commonly a battery, can be used to provide power to different subsystems on the E-refuse vehicle. The energy storage device is also configured to provide hydraulic power to different subsystems on the E-refuse vehicle through an electric power take-off (E-PTO) device. The E-PTO receives electric power from the energy storage device and provides the electric power to an electric motor. The electric motor drives a hydraulic pump that provides pressurized hydraulic fluid to different vehicle subsystems, including the compactor and the lifting system.

As is described in further detail herein, the refuse vehicle may include a thermal monitor controls system. The thermal monitor controls system may be used to monitor and identify non-normal operation of onboard devices (e.g., a battery, a drive component, a hydraulic power system, an E-PTO device, a lifting system, a pump, an actuator, a motor, etc.). For example, the thermal monitor controls system may include a plurality of sensors (e.g., a thermal sensor, a flow sensor, an electrical current sensor, etc.) that may be used to monitor the onboard devices. In certain example embodiments, the sensors may monitor the onboard devices during a calibration cycle to identify normal operating conditions of the onboard devices. For example, the sensors may record data corresponding to the onboard devices during the calibration cycle (e.g., the first 10 hours of use for the refuse vehicle, over the course of a specified route, etc.) and the thermal monitor controls system may analyze this data to define a baseline (i.e., normal operating conditions) for the onboard devices based on the data received by the sensors. After the calibration cycle is completed, the sensors may continue to record data corresponding to the onboard devices. The thermal monitor controls system may the compare the newly recorded data to the normal operating conditions to determine if any non-normal operating conditions exist. If a non-normal operating condition is detected, the operator of the refuse vehicle may be alerted.

Figure 1:
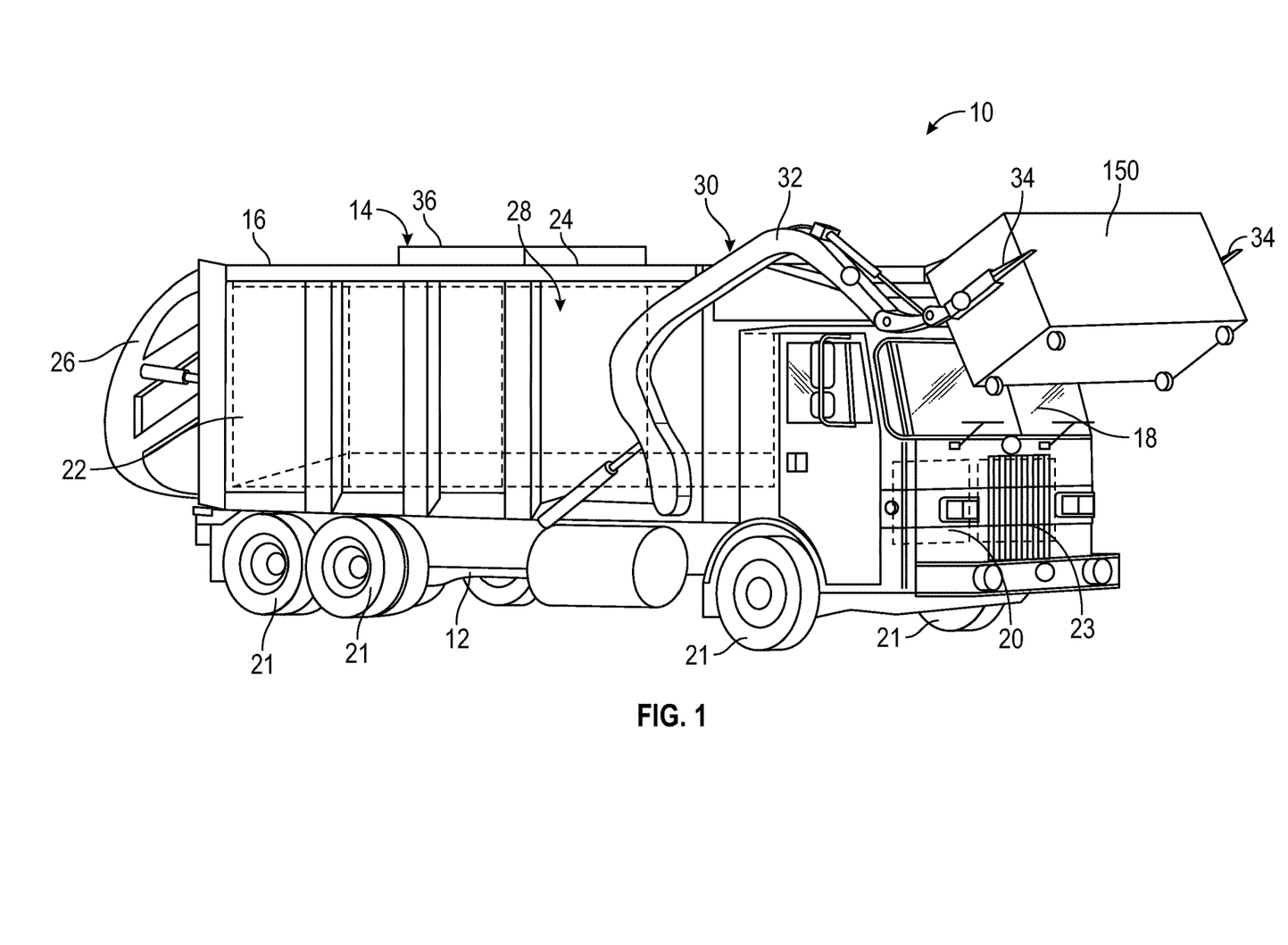
FIG. 1 is a perspective view of a front loading refuse vehicle according to an exemplary embodiment.
Figure 2:
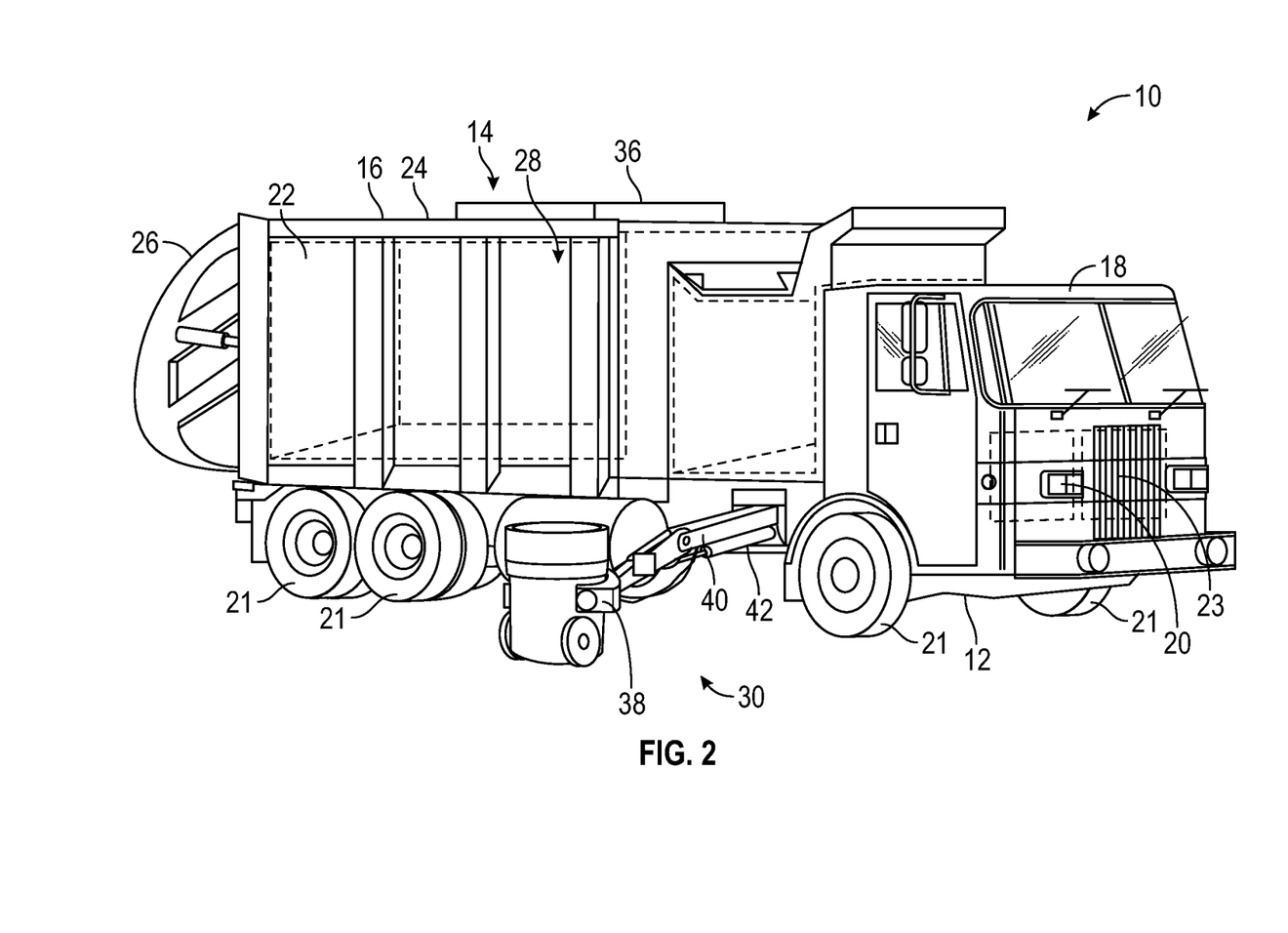
FIG. 2 is a perspective view of a side loading refuse vehicle according to an exemplary embodiment.
Figure 3:
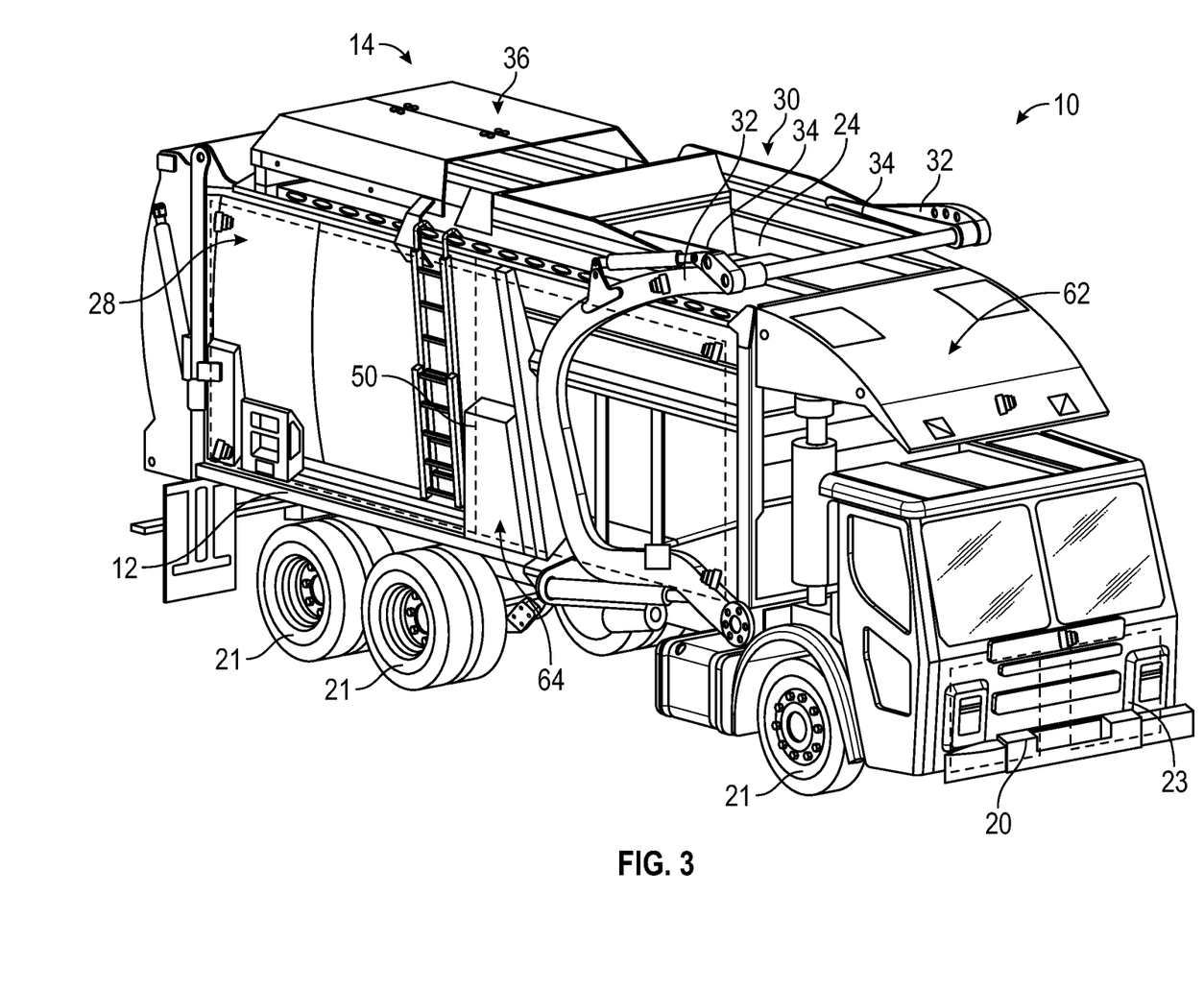
FIG. 3 is a front perspective view of an electric front loading refuse vehicle according to an exemplary embodiment.

Referring to FIGS. 1-3, a vehicle, shown as refuse truck 10 (e.g., garbage truck, waste collection truck, sanitation truck, etc.), includes a chassis, shown as a frame 12, and a body assembly, shown as body 14, coupled to the frame 12. The body assembly 14 defines an on-board receptacle 16 and a cab 18. The cab 18 is coupled to a front end of the frame 12, and includes various components to facilitate operation of the refuse truck 10 by an operator (e.g., a seat, a steering wheel, hydraulic controls, etc.) as well as components that can execute commands automatically to control different subsystems within the vehicle (e.g., computers, controllers, processing units, etc.). The refuse truck 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). In one embodiment, the prime mover 20 is one or more electric motors coupled to the frame 12. The electric motors may consume electrical power from an on-board energy storage device (e.g., batteries 23, ultracapacitors, etc.), from an on-board generator (e.g., an internal combustion engine), or from an external power source (e.g., overhead power lines) and provide power to the systems of the refuse truck 10.

According to an exemplary embodiment, the refuse truck 10 is configured to transport refuse from various waste receptacles within a municipality to a storage or processing facility (e.g., a landfill, an incineration facility, a recycling facility, etc.). As shown in FIGS. 1-3, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 extend over or in front of the cab 18. According to the embodiment shown in FIGS. 1-3, the on-board receptacle 16 and collection chamber 28 are each positioned behind the cab 18. In some embodiments, the collection chamber 28 includes a hopper volume and a storage volume. Refuse is initially loaded into the hopper volume and thereafter compacted into the storage volume. According to an exemplary embodiment, the hopper volume is positioned between the storage volume and the cab 18 (i.e., refuse is loaded into a position behind the cab 18 and stored in a position further toward the rear of the refuse truck 10).

Referring again to the exemplary embodiment shown in FIG. 1, the refuse truck 10 is a front-loading refuse vehicle. As shown in FIG. 1, the refuse truck 10 includes a lifting system 30 that includes a pair of arms 32 coupled to the frame 12 on either side of the cab 18. The arms 32 may be rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container 150 (e.g., protrude through apertures within the refuse container 150, etc.). During operation of the refuse truck 10, the forks 34 are positioned to engage the refuse container 150 (e.g., the refuse truck 10 is driven into position until the forks 34 protrude through the apertures within the refuse container 150). As shown in FIG. 1, the arms 32 are rotated to lift the refuse container 150 over the cab 18. A second actuator (e.g., a hydraulic cylinder articulates the forks 34 to tip the refuse out of the container and into the hopper volume of the collection chamber 28 through an opening in the cover 24. The actuator thereafter rotates the arms 32 to return the empty refuse container 150 to the ground. According to an exemplary embodiment, a top door 36 is slid along the cover 24 to seal the opening thereby preventing refuse from escaping the collection chamber 28 (e.g., due to wind, etc.).

Referring to the exemplary embodiment shown in FIG. 2, the refuse truck 10 is a side-loading refuse vehicle that includes a lifting system, shown as a grabber 38 that is configured to interface with (e.g., engage, wrap around, etc.) a refuse container 150 (e.g., a residential garbage can, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder 42) articulates the arm 40 and positions the grabber 38 to interface with the refuse container 150. The arm 40 may be movable within one or more directions (e.g., up and down, left and right, in and out, rotation, etc.) to facilitate positioning the grabber 38 to interface with the refuse container 150. According to an alternative embodiment, the grabber 38 is movably coupled to the body 14 with a track. After interfacing with the refuse container 150, the grabber 38 is lifted up the track (e.g., with a cable, with a hydraulic cylinder, with a rotational actuator, etc.). The track may include a curved portion at an upper portion of the body 14 so that the grabber 38 and the refuse container 150 are tipped toward the hopper volume of the collection chamber 28. In either embodiment, the grabber 38 and the refuse container 150 are tipped toward the hopper volume of the collection chamber 28 (e.g., with an actuator, etc.). As the grabber 38 is tipped, refuse falls through an opening in the cover 24 and into the hopper volume of the collection chamber 28. The arm 40 or the track then returns the empty refuse container 150 to the ground, and the top door 36 may be slid along the cover 24 to seal the opening thereby preventing refuse from escaping the collection chamber 28 (e.g., due to wind).

Referring to FIG. 3, the refuse truck 10 is a front loading E-refuse vehicle. Like the refuse truck 10 shown in FIG. 1, the E-refuse vehicle includes a lifting system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container 150 (e.g., protrude through apertures within the refuse container 150, etc.). During operation of the refuse truck 10, the forks 34 are positioned to engage the refuse container 150 (e.g., the refuse truck 10 is driven into position until the forks 34 protrude through the apertures within the refuse container 150). A second actuator (e.g., a hydraulic cylinder) articulates the forks 34 to tip the refuse out of the container and into the hopper volume of the collection chamber 28 through an opening in the cover 24. The actuator thereafter rotates the arms 32 to return the empty refuse container 150 to the ground. According to an exemplary embodiment, a top door 36 is slid along the cover 24 to seal the opening thereby preventing refuse from escaping the collection chamber 28 (e.g., due to wind, etc.).

Still referring to FIG. 3, the refuse truck 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor) rotates a transmission shaft, which in turn rotates the wheels 21 of the vehicle. The batteries 23 can supply additional subsystems on the refuse truck 10, including additional electric motors, cab controls (e.g., climate controls, steering, lights, etc.), the lifting system 30, and/or the compactor 50, for example.

Figure 4:
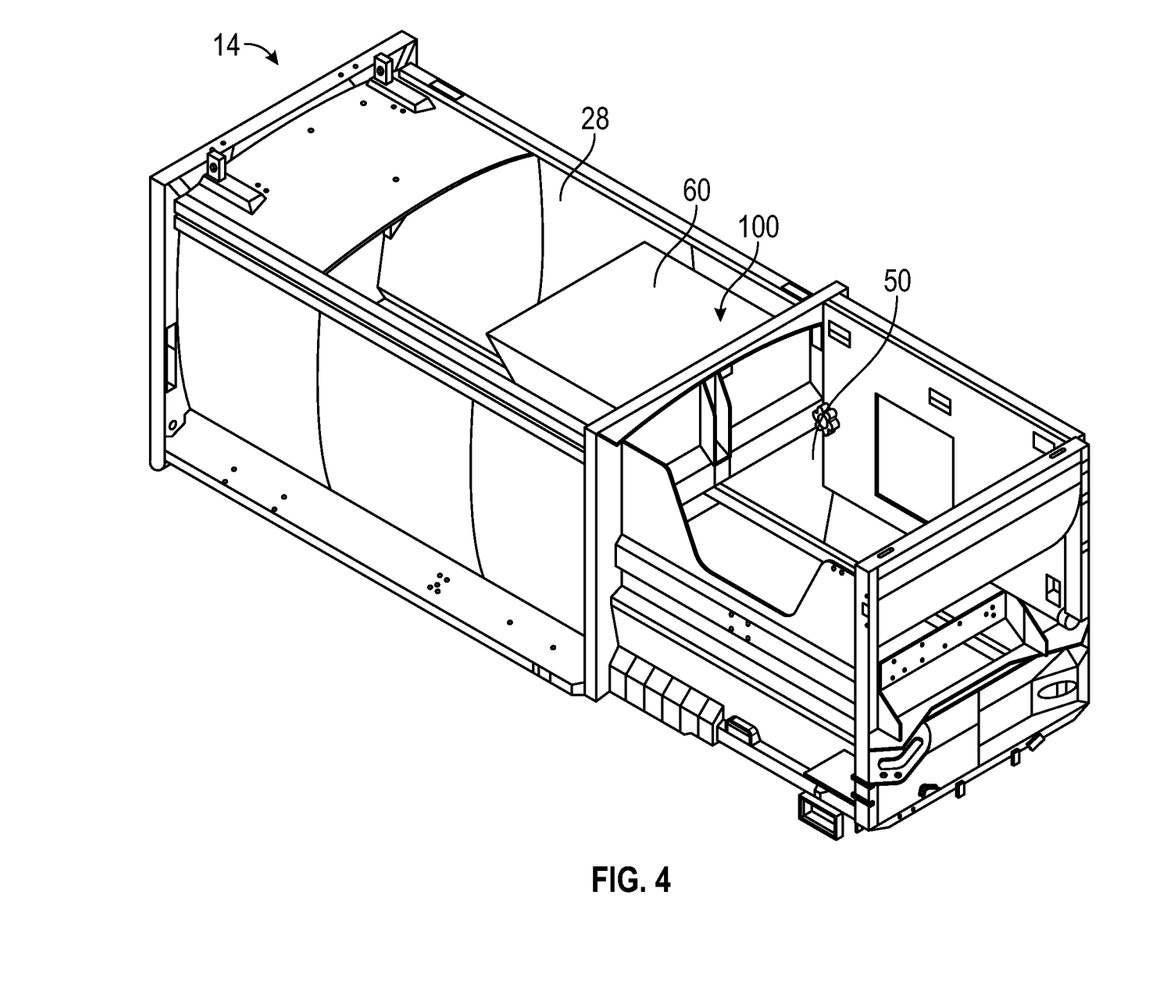
FIG. 4 is a top perspective view of a body assembly of the refuse vehicle of FIG. 3, according to an exemplary embodiment.
Figure 5:
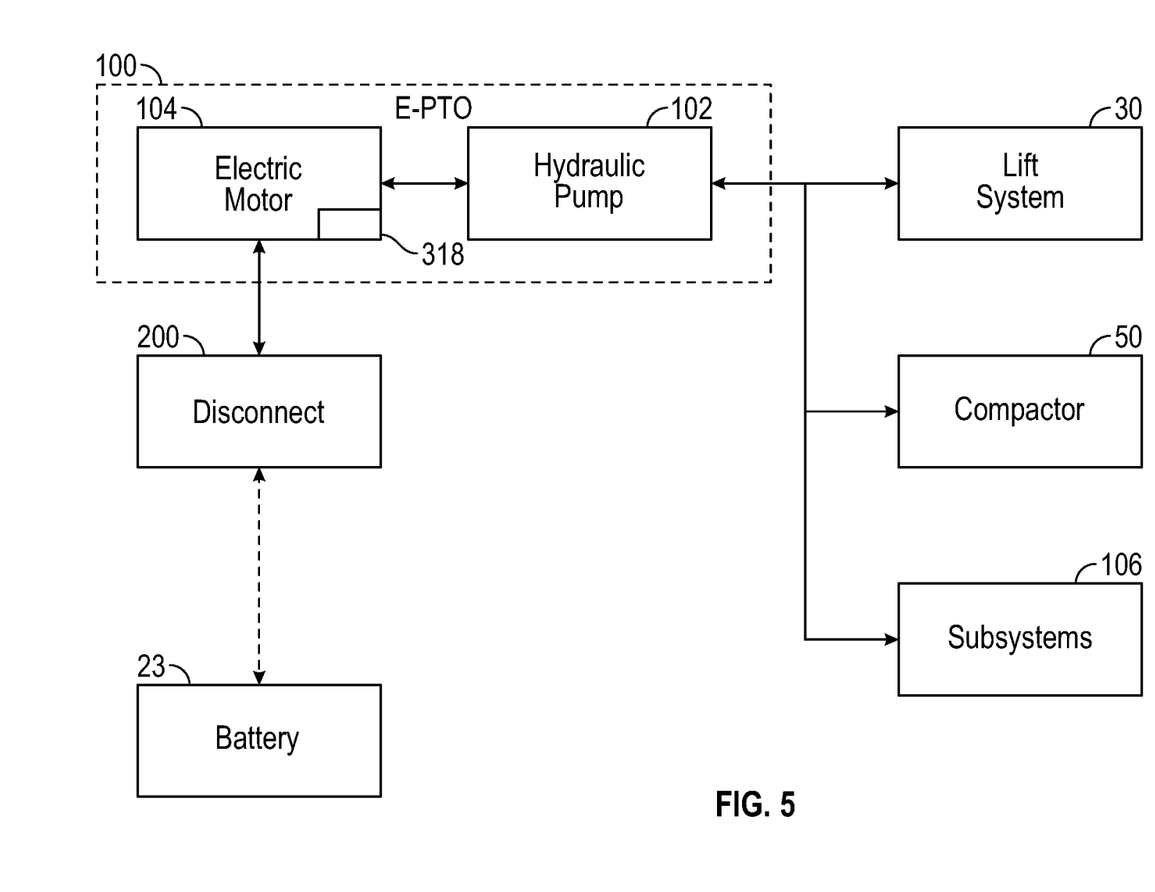
FIG. 5 is a schematic view of a control system of the refuse vehicle of FIG. 3.

The refuse truck 10 can be considered a hybrid refuse vehicle as it includes both electric and hydraulic power systems. As depicted in FIGS. 3-5, the refuse truck 10 includes an E-PTO system 100. The E-PTO system 100 is configured to receive electrical power from the batteries 23 and convert the electrical power to hydraulic power. In some examples, the E-PTO system 100 includes an electric motor driving a hydraulic pump 102. The hydraulic pump 102 pressurized hydraulic fluid onboard the refuse truck 10, which can then be supplied to various hydraulic cylinders and actuators present on the refuse truck 10. For example, the hydraulic pump 102 can provide pressurized hydraulic fluid to each of the hydraulic cylinders within the lift system 30 on the refuse truck. Additionally or alternatively, the hydraulic pump 102 can provide pressurized hydraulic fluid to a hydraulic cylinder controlling the compactor 50. In still further embodiments, the hydraulic pump 102 provides pressurized hydraulic fluid to the hydraulic cylinders that control a position and orientation of the tailgate 26. The E-PTO system 100 can be positioned about the refuse truck 10 in various different places. For example, the E-PTO system 100 may be positioned within a housing 60 above or within the on-board receptacle 16 (see FIG. 4), beneath a canopy 62 extending over a portion of the cab 18, or within a dedicated housing 64 alongside the vehicle body 14. Although the E-PTO system 100 may be in electrical communication with the batteries 23, the E-PTO system 100 can be separate from and spaced apart from the vehicle frame 12.

With continued reference to FIG. 5, the refuse truck 10 includes a disconnect 200 positioned between the batteries 23 and the E-PTO system 100. The disconnect 200 provides selective electrical communication between the batteries 23 and the E-PTO system 100 that can allow the secondary vehicle systems (e.g., the lift system, compactor, etc.) to be decoupled and de-energized from the electrical power source. The disconnect 200 can create an open circuit between the batteries 23 and the E-PTO system 100, such that no electricity is supplied from the batteries 23 to the electric motor 104. Without electrical power from the batteries 23, the electric motor 104 will not drive the hydraulic pump 102. Pressure within the hydraulic system will gradually decrease, such that none of the lifting system 30, compactor 50, or vehicle subsystems 106 relying upon hydraulic power will be functional. The refuse truck 10 can then be operated in a lower power consumption mode, given the reduced electrical load required from the batteries 23 to operate the refuse truck 10. The disconnect 200 further enables the refuse truck 10 to conserve energy when the vehicle subsystems are not needed, and can also be used to lock out the various vehicle subsystems to perform maintenance activities. The disconnect 200 further allows an all-electric vehicle chassis to be retrofit with hydraulic power systems, which can be advantageous for a variety of reasons, as hydraulic power systems may be more responsive and durable than fully electric systems. In some examples, the E-PTO system 100 includes a dedicated secondary battery 108 that is configured to supply electrical power to the E-PTO system 100 if the disconnect 200 is tripped, such that the secondary vehicle systems can remain optional even when the E-PTO system 100 is not receiving electrical power from the batteries 23.

Figure 6:
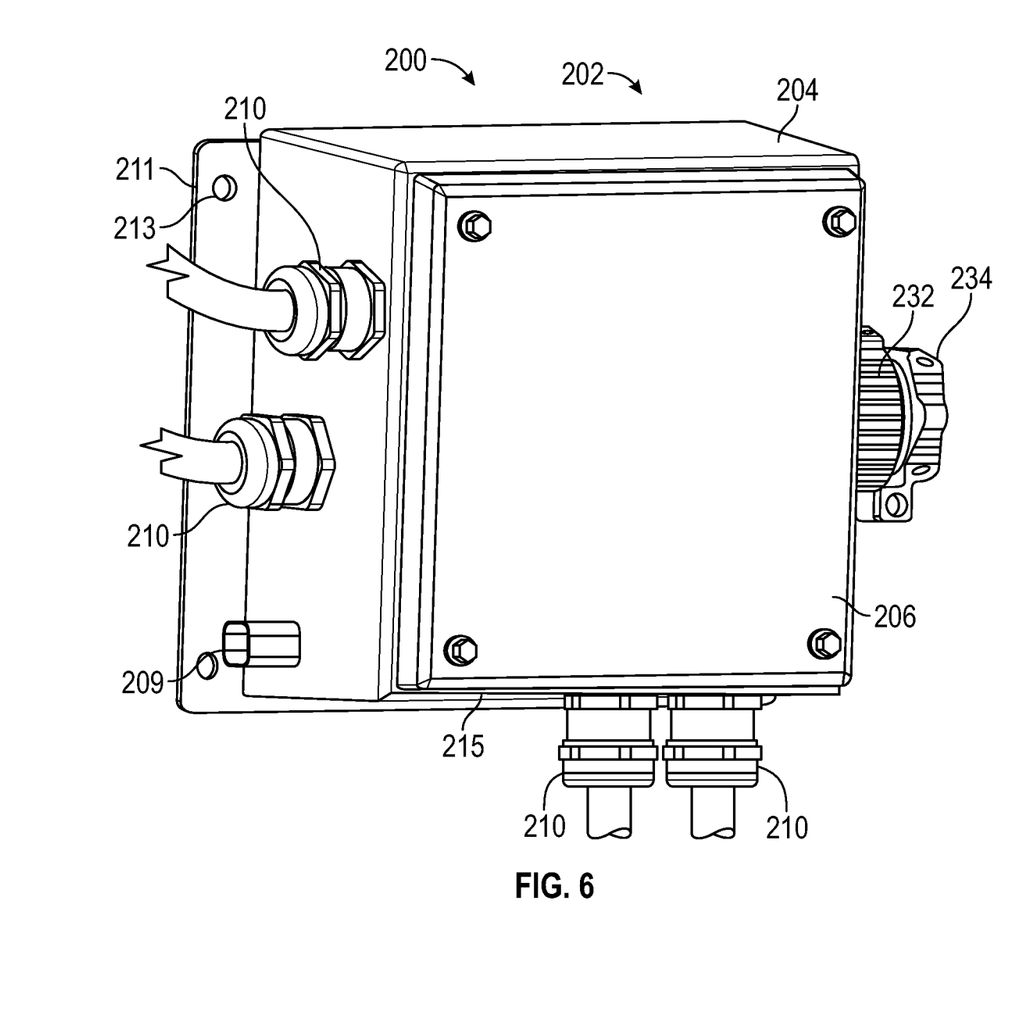
FIG. 6 is a perspective view of an electric power control box included within the control system of FIG. 5 and the refuse vehicle of FIG. 3.
Figure 7:
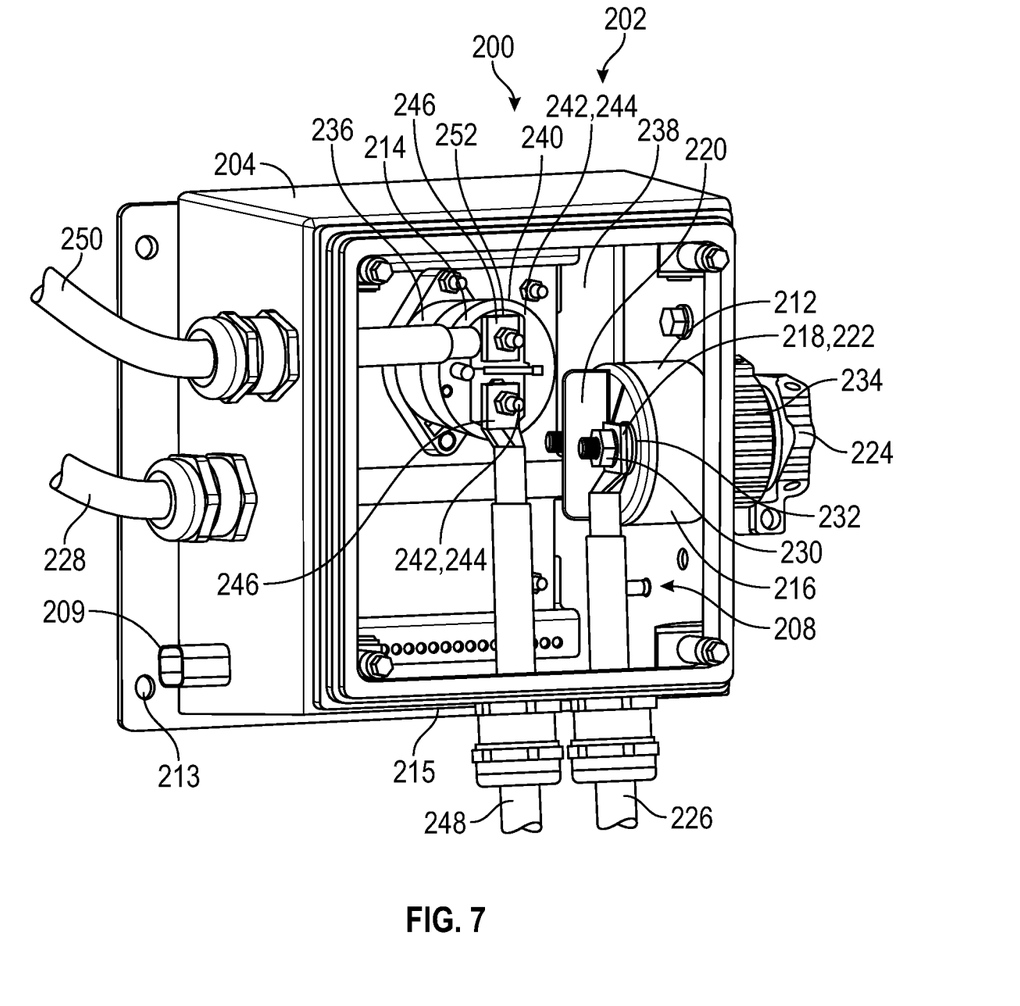
FIG. 7 is a perspective view of the electric power control box of FIG. 6 with a cover of the electric power control box removed.

FIGS. 6-7 depict an electric power control box 202 that can function as the disconnect 200. The electric power control box 202 generally includes a housing 204 and a cover 206 that together define a waterproof cavity 208. The waterproof cavity 208 receives and supports electrical connections between the E-PTO system 100 and the batteries 23 to create a selective electrical coupling between the two. Fittings 210 are positioned about the perimeter of the housing 204 and define passages through the housing 204 to receive electrical inputs. The fittings 210 can be rigidly coupled (e.g., welded) or removably coupled (e.g., threaded) to the housing 204 so that a water tight seal is formed between the fittings 210 and the housing 204. In some examples, a low voltage connector tube 209 extends through the housing 204 and into the cavity 208 as well. The housing 204 is configured to be mounted to the body 14 of the refuse truck 10. As depicted in FIGS. 6-7, the housing 204 includes a mounting flange 211 extending around at least a portion of the housing 204. The mounting flange 211 includes a plurality of mounting holes 213 that can be used to fasten the housing 204 to the body 14 of the refuse truck 10. In some examples, a vent 215 is formed within an underside of the housing 204 to allow cooling air to enter into the cavity 208.

Figure 8:
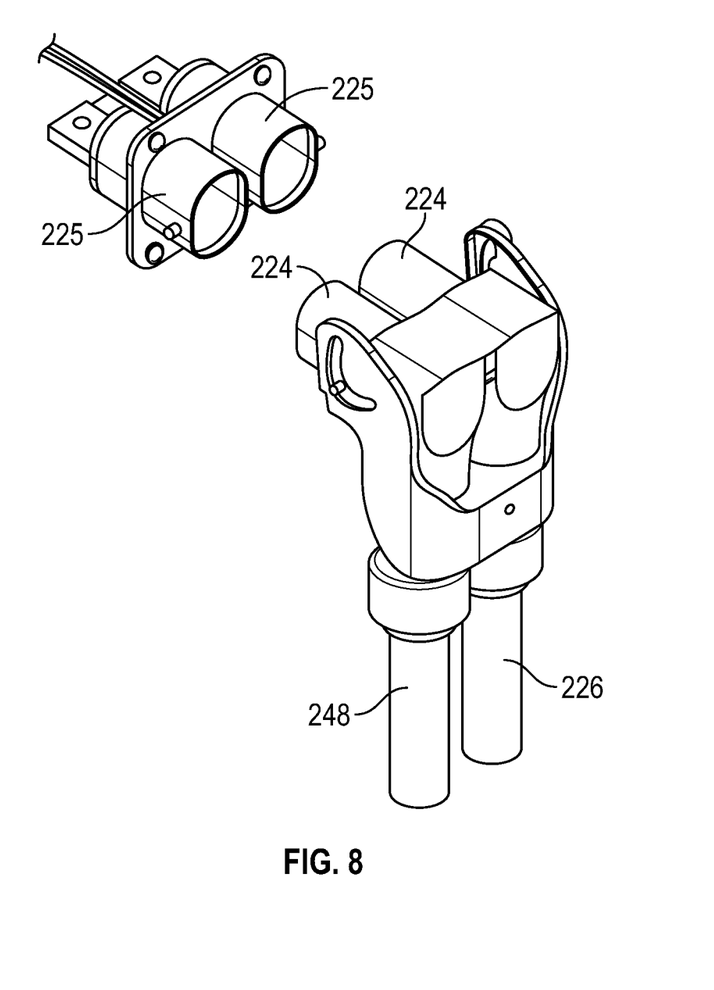
FIG. 8 is a perspective view of a plug that can be used within the electric power control box of FIG. 6.

The electric power control box 202 provides a positive terminal connection or bus 212 and a negative terminal connection or bus 214 to create an electrical coupling between the E-PTO system 100 and the batteries 23. As depicted in FIG. 7, the positive terminal bus 212 has a generally cylindrical body 216 and defines two distinct terminals 218 that are separated from one another by a dividing wall 220. In some examples, the terminals 218 are at least partially defined by threaded shanks 222 extending outward from the body 216 to receive and secure cable connectors 224 (e.g., ring terminals, two-pole high voltage connectors with integrated high voltage interlock loop as depicted in FIG. 8, etc.). For example, one of the threaded shanks 222 can receive the connector 224 that is coupled to a high voltage positive shielded cable 226 that is coupled to the batteries 23, while the other terminal 218 can receive the connector 224 that is coupled to a high voltage positive shielded cable 228 that extends to the E-PTO system 100. If the connectors 224 are formed as ring terminals, a nut 230 can be used to secure the connectors 224 in place on each respective terminal 218. An electrical coupling is then established between each cable 226, 228 and the positive terminal bus 212 by joining the conductive connectors 224 to the conductive shanks 222, which extend inward to an internal circuit within the cylindrical body 216, as explained in additional detail below. The dividing wall 220 can help prevent unwanted direct contact between the connectors 224 of the positive shielded cables 226, 228. In some examples, the connector 224 on the cable 228 can be formed so that the ring portion extends perpendicularly away from a longitudinal axis of the cable 228. Accordingly, the cable 228 can be coupled to the terminal 218 without bending or otherwise manipulating a shape of the cable 228.

The positive terminal bus 212 includes an externally accessible switch 232 that allows a user to manually control the electrical connections within the positive terminal bus 212. As depicted in FIG. 7, the cylindrical body 216 of the positive terminal bus 212 extends through and out of the housing 204. A waterproof cap 234 is hingedly coupled to an external end of the body 216 to provide selective access to a switch 232 within the body 216. As explained below, the switch 232 is movable between an open position and a closed position. In the closed position, the terminals 218 are electrically coupled to one another and electrical power transmitted through the cable 226 can be transferred through the positive terminal bus 212 to the cable 228 and to the E-PTO system 100. In the open position, the terminals 218 are electrically decoupled and electrical communication between the cables 226, 228 is blocked.

The negative terminal bus 214, like the positive terminal bus 212, includes a generally cylindrical body 236. The generally cylindrical body 236 is mounted (e.g., using fasteners) to a back wall 238 of the housing 204. In some examples, the cylindrical body 236 is coupled to a ground plate 240 that extends partially along the back wall 238 of the housing 204. The negative terminal bus 214 supports two terminals 242 that are again separated from one another by a dividing wall 244. The terminals 242 are again formed as threaded shanks 244 extending outward from the body 236 to receive and secure cable connectors 246 (e.g., ring terminals, two-pole high voltage connectors with integrated high voltage interlock loop as depicted in FIG. 8, etc.) As depicted in FIG. 7, one of the threaded shanks 244 receives a connector 246 that is coupled to a high voltage negative shielded cable 248 that is coupled to the batteries 23, while the other terminal 242 receives a connector 246 that is coupled to a high voltage negative shielded cable 250 that is coupled to the E-PTO system 100. If the connectors 246 are ring terminals, nuts 252 can be used to secure the connectors 246 in place on each respective terminal 242. With the nuts 252 securing the connectors 246 to the terminals 242, an electrical coupling is established between each cable 248, 250 and the negative terminal bus 214. The divider wall 244 can inhibit unwanted direct contact between the connectors 246, which in turn prevents unwanted direct contact between the cables 248, 250. Alternatively, each of the connectors 224, 246 can be formed as two-pole high voltage connectors with integrated high voltage interlock loops, as depicted in FIG. 8. The connector 224 can be plugged into female terminals 225 formed in the positive terminal bus 212 while the connector 246 can be plugged into female terminals 247 formed in the negative terminal bus 214.

Figure 9:
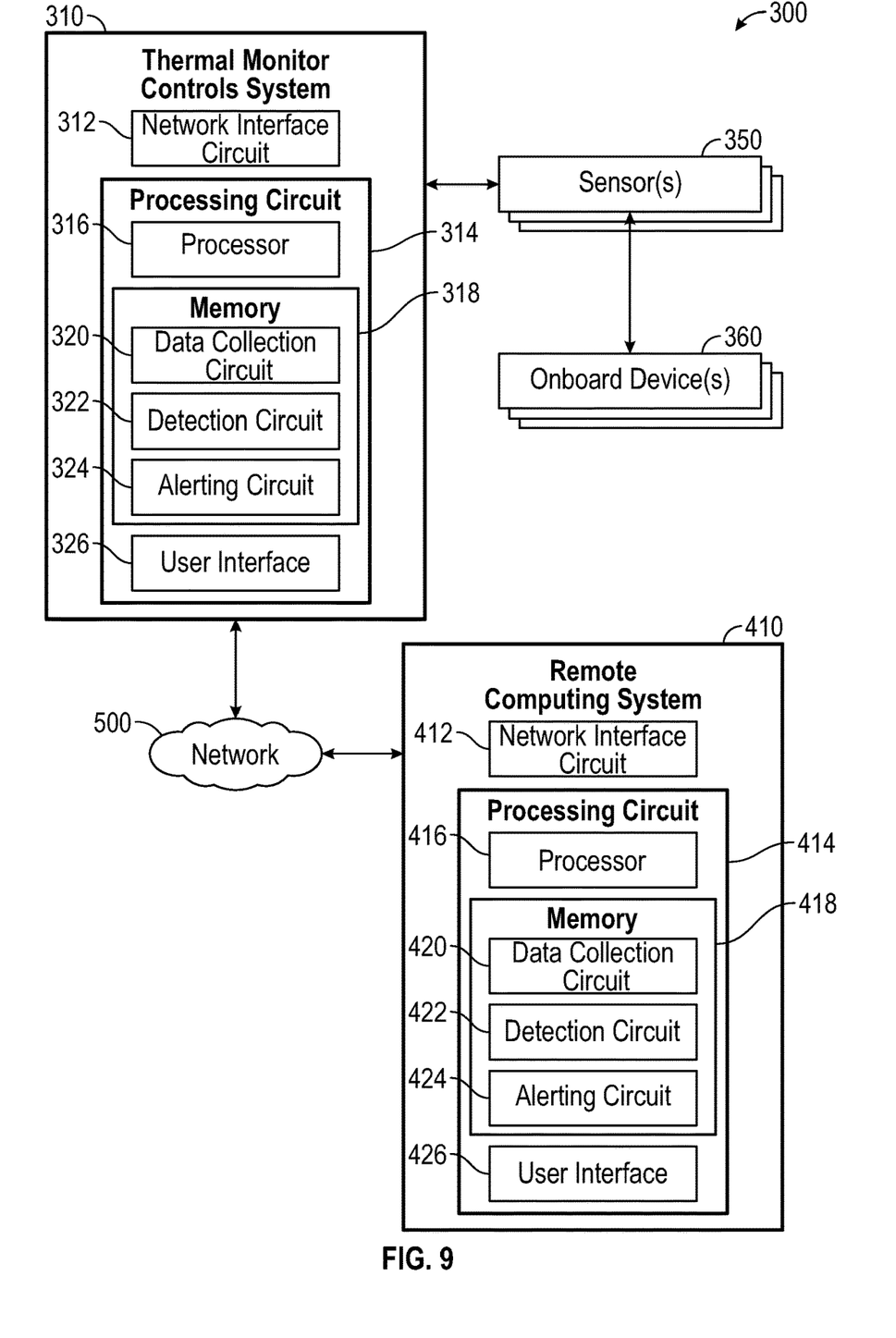
FIG. 9 is a schematic diagram of a monitoring system according to an example embodiment.

Referring now to FIG. 9, a monitoring system 300 is shown according to an example embodiment. The monitoring system 300 includes a thermal monitor controls system 310. For example, the thermal monitor controls system 310 may be included on a refuse vehicle 10. The thermal monitor control system 310 may include one or more sensor(s) 350 configured to record data associated with various onboard device(s) 360. The sensor(s) 350 may include any type of sensor that may record data corresponding to the onboard device(s) 360, including a heat sensor, a thermal vision camera, a thermometer, an electric current sensor, pressure sensors, fuel level sensors, flow rate sensors, voltage detectors, noise meters, air pollution sensors, mass flow rate sensors, etc. and any combination thereof. The onboard device(s) includes any equipment that is a part of the refuse vehicle 10, including the batteries 23, the tailgate 26, the lifting system 30, the top door 36, the grabber 38, the hydraulic cylinder 42, the compactor 50, the E-PTO system 100, the hydraulic pump 102, the electric motor 104, the dedicated secondary battery 108, the electric power control box 202, the bus 214, the vent 215, the high voltage positive shielded cables 226, 228, the high voltage negative shielded cables 248, 250, the thermal monitor controls system 310, and all sub components thereof.

In certain embodiments, each sensor 350 is configured to record data related to one or more onboard devices 360. For example, a thermal sensor 350 may detect and record the temperature of the batteries 23. In certain embodiments, more than one sensor 350 is used to record data related to a single onboard device 360. For example, a thermal sensor 350 may detect and record the temperature of the batteries 23 and an electric flow sensor 350 may be used to record the current going into and/or out of the batteries 23.

In various embodiments, the remainder of the thermal monitor controls system 310 is communicably coupled to sensor(s) 350, such that the data recorded by the sensor(s) 350 may be saved and analyzed. In certain embodiments, the thermal monitor controls system 310 includes a network interface circuit 312 configured to enable the thermal monitor controls system 310 to exchange information over a network 500. The network interface circuit 312 can include program logic that facilitates connection of the thermal monitor controls system 310 to the network 500 (e.g., a cellular network, Wi-Fi, Bluetooth, radio, etc.). The network interface circuit 312 can support communications between the thermal monitor controls system 310 and other systems, such as a remote computing system 410. For example, the network interface circuit 312 can include a cellular modem, a Bluetooth transceiver, a radio-frequency identification (RFID) transceiver, and a near-field communication (NFC) transmitter. In some embodiments, the network interface circuit 312 includes the hardware and machine-readable media sufficient to support communication over multiple channels of data communication.

The thermal monitor controls system 310 is shown to include a processing circuit 314 and a user interface 326. The processing circuit 314 may include a processor 316 and a memory 318. The processor 316 may be coupled to the memory 318. The processor 316 may be a general purpose or specific purpose processor, an application specific integrated circuit (ASIC), one or more field programmable gate arrays (FPGAs), a group of processing components, or other suitable processing components. The processor 316 is configured to execute computer code or instructions stored in the memory 318 or received from other computer readable media (e.g., CDROM, network storage, a remote server, etc.).

The memory 318 may include one or more devices (e.g., memory units, memory devices, storage devices, etc.) for storing data and/or computer code for completing and/or facilitating the various processes described in the present disclosure. The memory 318 may include random access memory (RAM), read-only memory (ROM), hard drive storage, temporary storage, non-volatile memory, flash memory, optical memory, or any other suitable memory for storing software objects and/or computer instructions. The memory 318 may include database components, object code components, script components, or any other type of information structure for supporting the various activities and information structures described in the present disclosure. The memory 318 may be communicably connected to the processor 316 via processing circuit 314 and may include computer code for executing (e.g., by the processor 316) one or more of the processes described herein.

The data collection circuit 320 is configured to collect and store data collected by the sensor(s) 350. For example, the data collection circuit 320 may collect data during a calibration period of the refuse vehicle 10, and store this data, which may then be compared to newly collected data after the calibration period.

The detection circuit 322 is configured to receive signals from sensor(s) 350 and compare this data to the data stored by the data collection circuit 320 to detect the presence of a non-normal operating condition. A non-normal operating condition may include sensor readings that are significantly (e.g., +/−10%) different from the sensor readings taken during the calibration period. In some embodiments, detection circuit 322 determines a non-normal operating condition using an algorithm. For example, detection circuit 322 may determine a non-normal operating condition using a rate-of-change algorithm. Additionally or alternatively, detection circuit 322 may determine a non-normal operating condition using a pre-determined threshold (e.g., based on the data collected during the calibration period). For example, detection circuit 322 may determine the presence of a non-normal operating condition if a sensor detects the temperature of the batteries 23, or a region thereof, exceeds a threshold temperature (e.g., as determined by sensor(s) 350 during the calibration period). In some embodiments, detection circuit 322 detects a location of a non-normal operating condition. For example, detection circuit 322 may determine a non-normal operating condition is occurring in the lifting system 30 because the sensor 350 providing the non-normal data is located proximate the lifting system 30. In some embodiments, detection circuit 322 classifies the non-normal operating condition. For example, a divergence of 5% from the data taken during the calibration period may be classified by the detection circuit 322 as a low-risk non-normal operating condition while a divergence of 60% may be classified by the detection circuit 322 as a high-risk non-normal operating condition. In various embodiments, when a classified by the detection circuit 322 as a low-risk non-normal operating condition is detected by the detection circuit 322, the non-normal operating condition is communicated to the alerting circuit 324.

Alerting circuit 324 is configured to perform one or more operations in response to receiving an indication of a non-normal operating condition. In some embodiments, alerting circuit 324 presents an indication of the thermal event to an operator of refuse vehicle 10. For example, alerting circuit 324 may control user interface 326 to display a warning to an operator of refuse vehicle 10.

User interface 326 is configured to present information to and receive information from a user. In some embodiments, user interface 326 includes a display device (e.g., a monitor, a touchscreen, hud, etc.). In some embodiments, user interface 326 includes an audio device (e.g., a microphone, a speaker, etc.). In various embodiments, user interface 326 receives alerts from alerting circuit 324 and presents the alerts to an operator of refuse vehicle 10. For example, user interface 326 may receive a visual alert from alerting circuit 324 and display a graphic on a display device to alert an operator of refuse vehicle 10 of a non-normal operating condition and the location of the non-normal operating condition associated with the refuse vehicle 10.

In some embodiments, alerting circuit 324 operates refuse vehicle 10. For example, alerting circuit 324 may cause the lifting system 30 to shut down in response to a non-normal operating condition being detected with respect to the lifting system 30. Additionally or alternatively, alerting circuit 324 may transmit one or more notifications. For example, alerting circuit 324 may transmit a notification to the network interface circuit 312, such that a notification may be sent via the network 500 to the remote computing system 410.

The remote computing system 410 may be the same or similar to the thermal monitor controls system 310. For example, the network interface circuit 412 may be the same or similar as the network interface circuit 213. Further, the processing circuit 414 and all the subcomponents (i.e., the processor 416, the memory 418, the data collection circuit 420, the detection circuit 422, the alerting circuit 424, and the user interface 426) may be the same or similar to the processing circuit 314 and all the respective subcomponents. The remote computing system 410 may be a fleet monitoring system. For example, in certain embodiments, the remote computing system 410 may be operated by a company that operates a fleet of refuse vehicles 10. The remote computing system 410 may be used to store data regarding one or more refuse vehicles 10. The remote computing system 410 may include cloud storage. The remote computing system 410 may store data which may be accessed by a third party computing system. Upon receiving an indication of a non-normal operating condition, the alerting circuit 424 may transmit a notification of the non-normal operating condition and associated information to an emergency response team (e.g., a 911 operator, a vehicle repair team, etc.). Additionally or alternatively, alerting circuit 424 may reroute refuse vehicle 10 and assign a different refuse vehicle 10 to replace the non-normal operating refuse vehicle 10. For example, in the case of a fully-autonomous refuse vehicle, alerting circuit 424 may reroute refuse vehicle 10 to a safe location (e.g., a service location, a fire station, away from a densely populated area, etc.). As a further example, alerting circuit 424 may notify an operator of refuse vehicle 10 of the non-normal operating condition and may generate a GPS route to a safe location for the operator.

Figure 10:
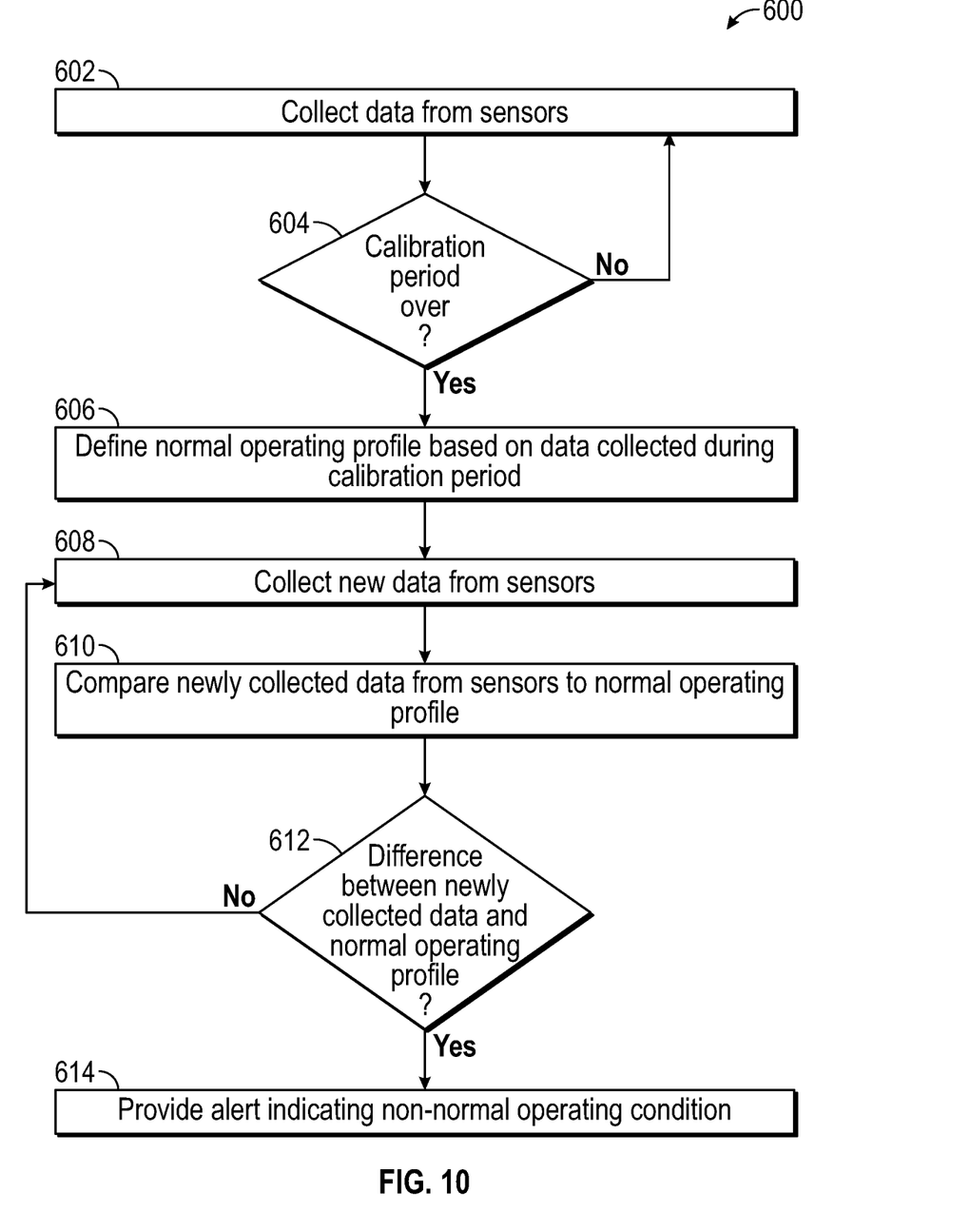
FIG. 10 is a block diagram of a thermal monitor control process according to an example embodiment.

Referring now to FIG. 10, a method of thermal monitor controls 600 is depicted according to an example embodiment. For example, the method of thermal monitor controls 600 may be performed by the thermal monitor controls system 310. The method of thermal monitor controls 600 may be used to identify normal operating conditions during a calibration period and identify non-normal operating conditions after the calibration period.

The thermal monitor controls process 600 begins with collecting data from sensors 350 during process 602. As described above, the refuse vehicle 10 may include one or more sensor(s) 350 configured to record data associated with various onboard device(s) 360. At decision 604, it is determined whether or not the calibration period has been completed. The calibration period may be a pre-determined amount of time (e.g., 10 hours of normal use of the refuse vehicle 10), a pre-determined task to be completed by the refuse vehicle (e.g., complete a full trash removal route), a pre-determined distance (e.g., 100 miles traveled by the refuse vehicle), or any other period. If the calibration period is not complete, the sensors 350 are configured to continue collecting data. Once the calibration period is completed, the process 600 advances to process 606.

Process 606 includes defining a normal operating profile for the refuse vehicle 10 based on the data collected by the sensors 350 at process 602. The normal operating profile represents the operating conditions of the refuse vehicle 10 when all the components are working properly. It should be appreciated that the normal operating profile may vary based on the task being performed by the refuse vehicle 10. For example, the normal operating profile while the refuse vehicle 10 may be different while the refuse vehicle 10 is loading refuse into the collection chamber 28 than the normal operating profile while the refuse vehicle 10 is traveling along a highway at high speeds. The normal operating profile may also vary based on environmental factors surrounding the refuse vehicle 10, which may be detected by the sensor(s) 350. For example, the normal operating profile of the refuse vehicle 10 may be different on a snowy day than a warm sunny day. The normal operating profile is therefore fluid, and may depend on the situation. The normal operating profile may be defined using data recorded by the sensors 350 while the refuse vehicle 10 is performing a specific task in specific conditions. Once the normal operating profile is defined, the process 600 advances to process 608.

Process 608 includes collecting new data from sensors 350 after the calibration period. For example, the sensor(s) may actively record data during operation of the refuse vehicle 10. This data may then be compared to the normal operating profile at process 610. Process 610 involves comparing the newly collected data at process 608 to the normal operating profile defined at process 606. As the data is being compared, a determination is made at decision 612. Decision 612 includes determining if there is a difference between the newly collected data and the normal operating profile. If there is no significant difference (i.e., the newly recorded data is less than a pre-determined percent different from the normal operating profile), the process 600 returns to process 608 and more data is collected from the sensors 350. If there is a significant difference, a non-normal operating condition is detected. A non-normal operating condition may include sensor readings that are significantly (e.g., +/−10%) different from the sensor readings taken during the calibration period. If a non-normal operating condition is detected, an alert indicating a non-normal operating condition is provided at process 614. For example, the alert may be provided to the alerting circuit 324 as discussed above.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle comprising:
a plurality of onboard devices including a first onboard device and a second onboard device;
a plurality of sensors including a first sensor configured to collect a first data set corresponding with a normal operating condition of the first onboard device and a second sensor configured to collect a second data set corresponding to a normal operating condition of the second onboard device;
an onboard messaging system configured to display an alert to an operator; and
a processing circuit comprising one or more processors coupled to non-transitory memory, wherein the processing circuit is configured to:
receive the first data set from the first sensor and the second data set from the second sensor;
define a normal operating profile for the first onboard device based on the first data set and the second onboard device based on the second data set;
receive a third data set from the first sensor and a fourth data set from the second sensor, wherein the third data set and the fourth data set are collected after the normal operating profile is defined; and
cause the onboard messaging system to display the alert to the operator in response to the third data set or the fourth data set differing from the normal operating profile.

2. The refuse vehicle of claim 1, wherein the first onboard device is a battery.

3. The refuse vehicle of claim 2, wherein the first sensor is a thermal sensor configured to measure a temperature of the first onboard device.

4. The refuse vehicle of claim 3, wherein the second onboard device is a drive component, wherein the battery is configured to supply power to the drive component.

5. The refuse vehicle of claim 4, wherein the second sensor is an electrical current sensor configured to measure an electrical current supplied to the drive component.

6. The refuse vehicle of claim 5, wherein defining the normal operating profile further comprises determining a correlation value based on the first data set and the second data set.

7. The refuse vehicle of claim 1, further comprising a network interface circuit configured to facilitate data transmission over a network, wherein the processing circuit is further configured provide the first, second, third, and fourth data set to a remote computing system.

8. The refuse vehicle of claim 7, wherein the processing circuit is configured to receive an alert notification from the remote computing system in response to the remote computing system determining the third data set or the fourth data set differs from the normal operating profile.

9. A method of monitoring onboard devices of a refuse vehicle, the method comprising:
providing the refuse vehicle comprising a plurality of onboard devices including a first onboard device and a second onboard device;
providing a plurality of sensors including a first sensor configured to collect a first data set corresponding with a normal operating condition of the first onboard device and a second sensor configured to collect a second data set corresponding to a normal operating condition of the second onboard device;
providing an onboard message system configured to display an alert to an operator;
measuring the first data set with the first sensor and the second data set with the second sensor;
defining a normal operating profile for the first onboard device based on the first data set and the second onboard device based on the second data set;
measuring a third data set with the first sensor and a fourth data set with the second sensor, wherein the third data set and the fourth data set are collected after the normal operating profile is defined; and
proving the alert to the onboard messaging system for display in response to the third data set or the fourth data set differing from the normal operating profile.

10. The method of claim 9, wherein the first onboard device is a battery.

11. The method of claim 10, wherein the first sensor is a thermal sensor configured to measure a temperature of the first onboard device.

12. The method of claim 11, wherein the second onboard device is a drive component, wherein the battery is configured to supply power to the drive component.

13. The method of claim 12, wherein the second sensor is an electrical current sensor configured to measure an electrical current supplied to the drive component.

14. The method of claim 13, wherein defining the normal operating profile further comprises determining a correlation between the first data set and the second data set.

15. The method of claim 9, further comprising:
providing, via a network interface circuit configured to facilitate data transmission over a network, the first, second, third, and fourth data set to a remote computing system.

16. The method of claim 15, further comprising:
receiving, via the network interface circuit, an alert notification from the remote computing system in response to the remote computing system determining the third data set or the fourth data set differs from the normal operating profile.

17. A remote computing system for monitoring components of a refuse vehicle, the remote computing system comprising:
a network interface circuit configured to facilitate data transmission over a network, and configured to:
receive a first data set from a first sensor corresponding with a normal operating condition of a first onboard device located on a first refuse vehicle and a second data set from a second sensor corresponding to a normal operating condition of a second onboard device located on the first refuse vehicle from the first refuse vehicle;

receive a third data set from the first sensor and a fourth data set from the second sensor from the first refuse vehicle, wherein the third data set and the fourth data set are collected after a normal operating profile is defined; and provide an alert to the first refuse vehicle; and a processing circuit comprising one or more processors coupled to non-transitory memory, the processing circuit configured to:

define the normal operating profile for the first onboard device based on the first data set and the second onboard device based on the second data set; and generate the alert in response to the third data set or the fourth data set differing from the normal operating profile.

18. The remote computing system of claim 17, wherein the first onboard device is a battery and the first sensor is a thermal sensor configured to measure a temperature of the first onboard device.

19. The remote computing system of claim 18, wherein the second onboard device is a drive component, wherein the battery is configured to supply power to the drive component; and wherein the second sensor is an electrical current sensor configured to measure an electrical current supplied to the drive component.

20. The remote computing system of claim 19, wherein defining the normal operating profile further comprises determining a correlation value based on the first data set and the second data set.

* * * * *